United States Patent
Gabriel et al.

[11] Patent Number: 6,158,387
[45] Date of Patent: *Dec. 12, 2000

[54] VENTILATED CAGE AND RACK SYSTEM

[75] Inventors: George Gabriel, Great Notch, N.J.; Chin Soo Park, Salisbury; John E. Sheaffer, Perryville, both of Md.

[73] Assignee: Lab Products Inc., Seaford, Del.

[ * ] Notice: This patent is subject to a terminal disclaimer.

[21] Appl. No.: 09/150,655

[22] Filed: Sep. 10, 1998

Related U.S. Application Data

[63] Continuation of application No. 08/715,657, Sep. 18, 1996, Pat. No. 5,954,013.

[51] Int. Cl.[7] .................................................. A01K 1/03
[52] U.S. Cl. .................................................... 119/419
[58] Field of Search .................................... 119/419, 455, 119/470, 472, 498, 500

[56] References Cited

U.S. PATENT DOCUMENTS

| | | | |
|---|---|---|---|
| 1,580,774 | 4/1926 | Barker | 119/455 |
| 3,456,618 | 7/1969 | Barlow | 119/456 |
| 3,830,200 | 8/1974 | Patterson | 119/419 |
| 4,249,482 | 2/1981 | Harr | 119/419 |
| 4,457,263 | 7/1984 | Cassou | 119/455 |
| 4,480,587 | 11/1984 | Sedlacek | 119/419 |
| 5,044,316 | 9/1991 | Thomas | 119/419 |
| 5,048,459 | 9/1991 | Niki et al. | 119/455 |
| 5,474,024 | 12/1995 | Hallock | 119/456 |
| 5,924,384 | 7/1999 | Deitrich et al. | 119/419 |

*Primary Examiner*—Peter M. Poon
*Assistant Examiner*—Elizabeth Shaw

[57] ABSTRACT

A ventilated cage and rack system which maximizes cage density within the rack is provided. The rack includes at least one air exhaust plenum, and at least one canopy disposed within the rack. The canopy is capable of supporting a first cage within the rack above the canopy, and also positioning a second cage below the canopy so as to maintain a gap between the top of the second cage and the canopy to permit air to be drawn into the air exhaust plenum from the interior of the second cage through the top of the second cage and to also permit ambient air to be drawn across the top of the second cage into the air exhaust plenum.

5 Claims, 11 Drawing Sheets

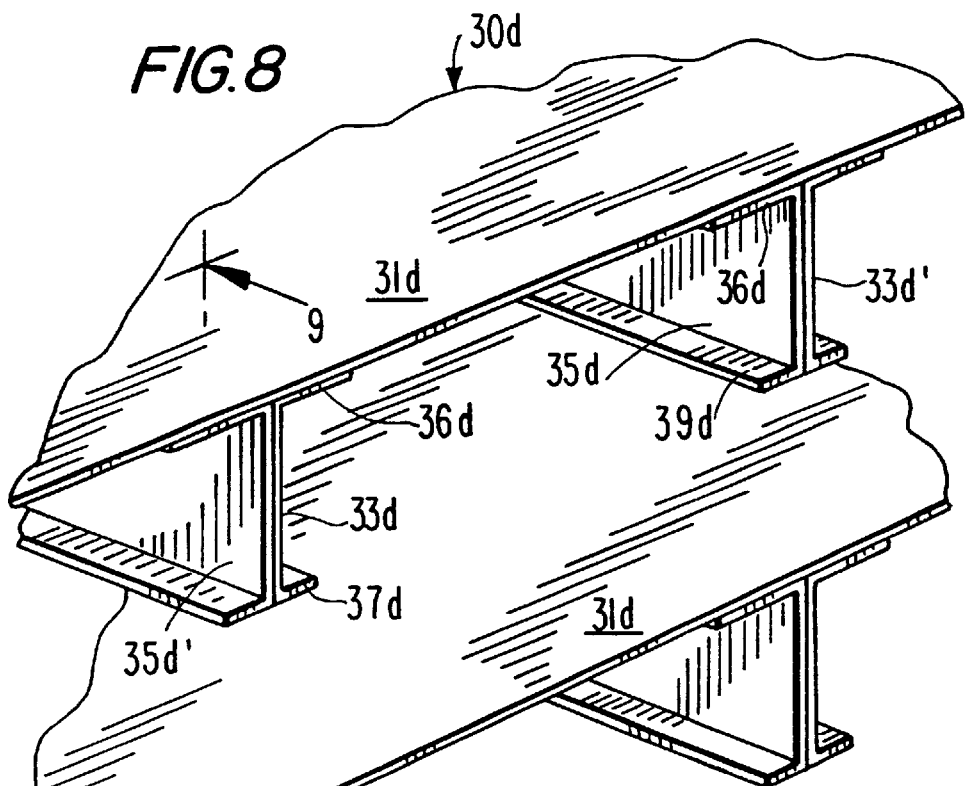
FIG.8
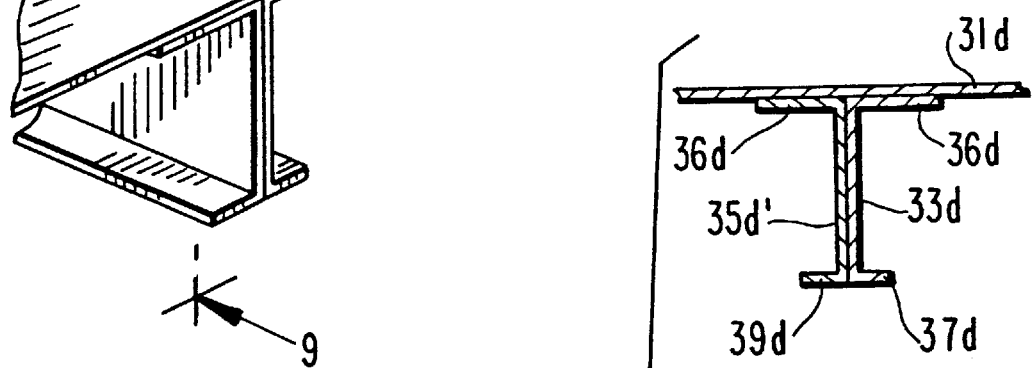
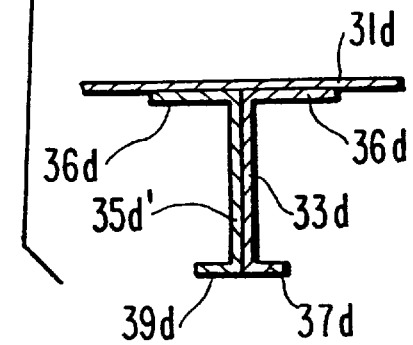
FIG.9

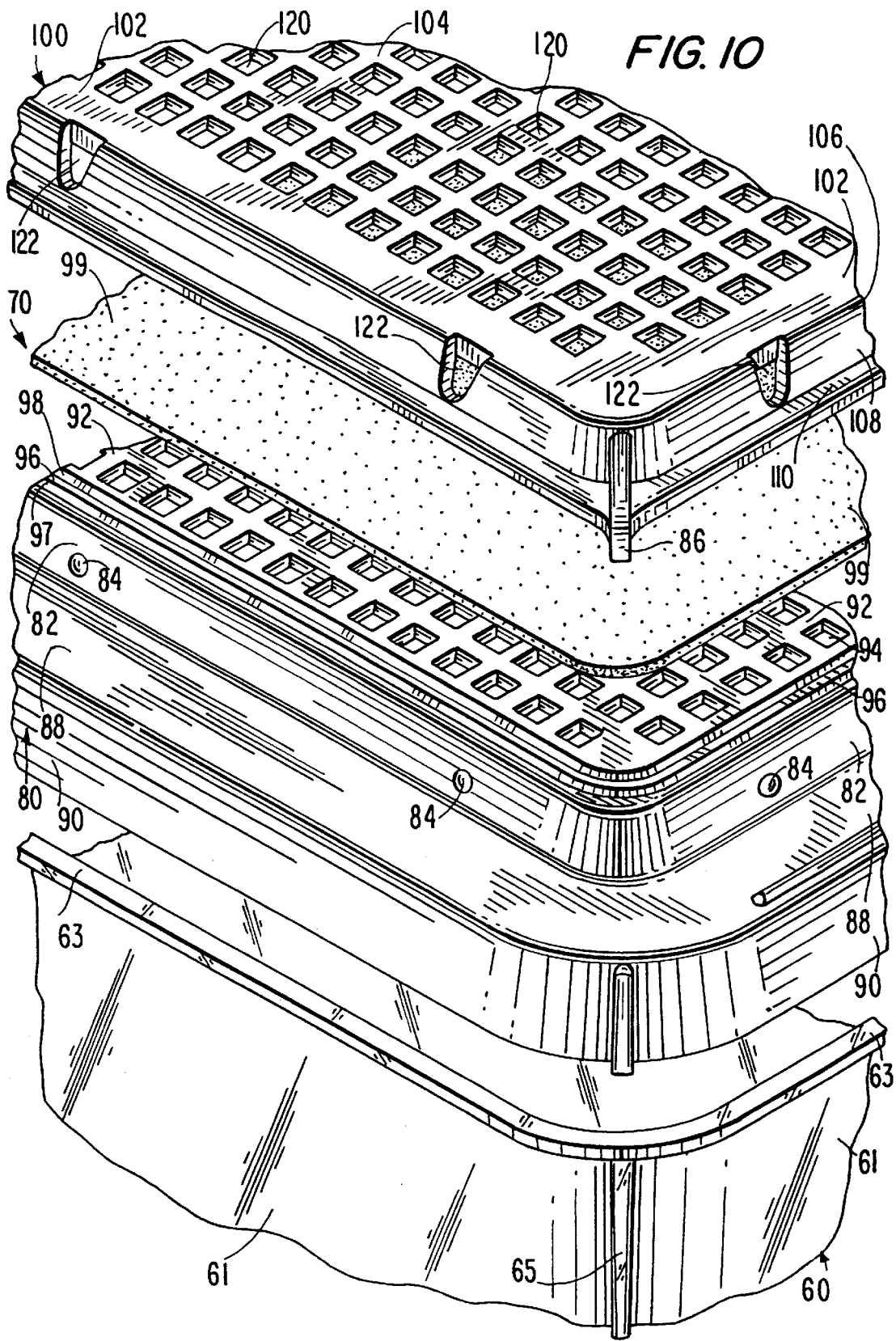

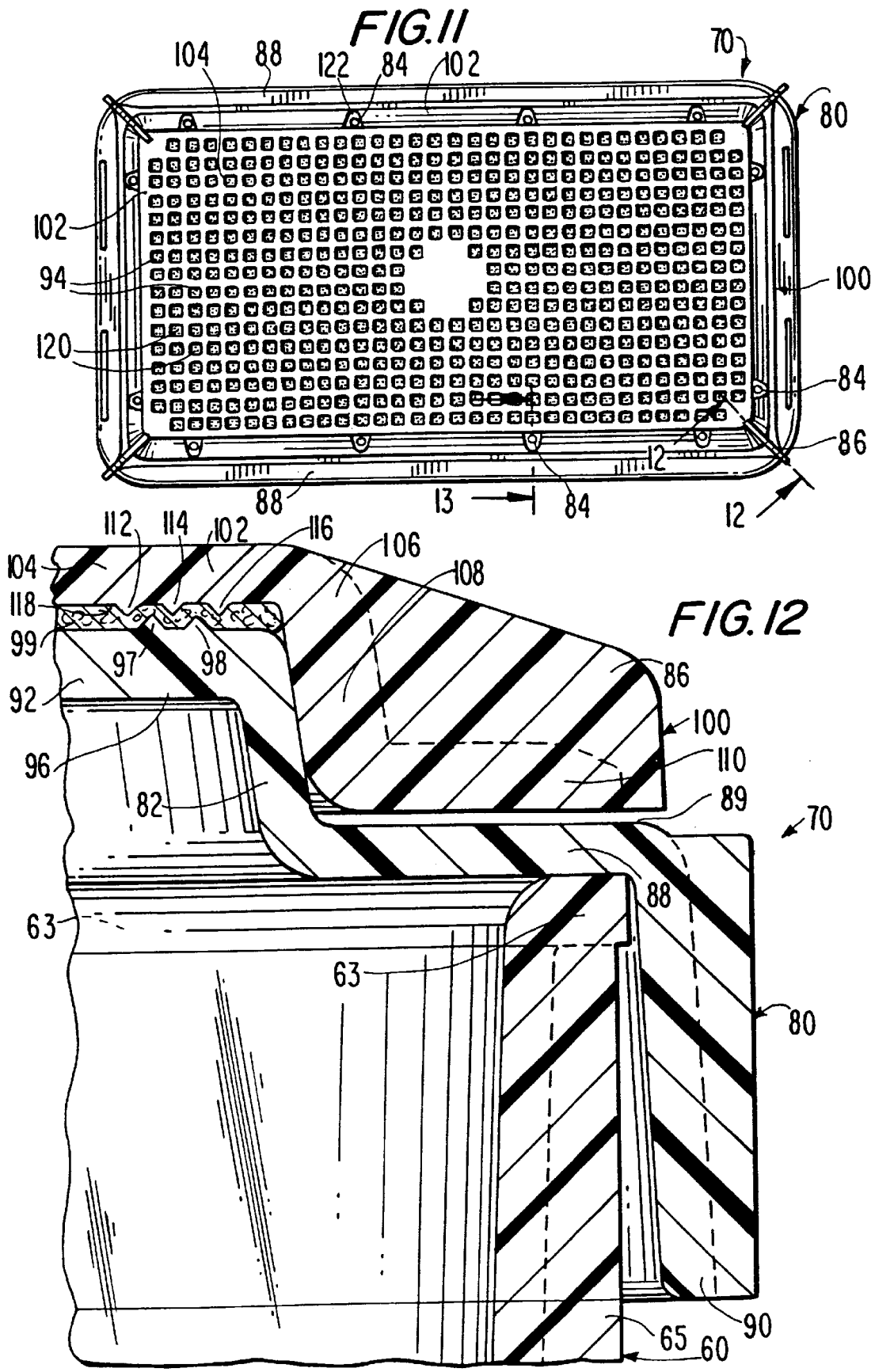

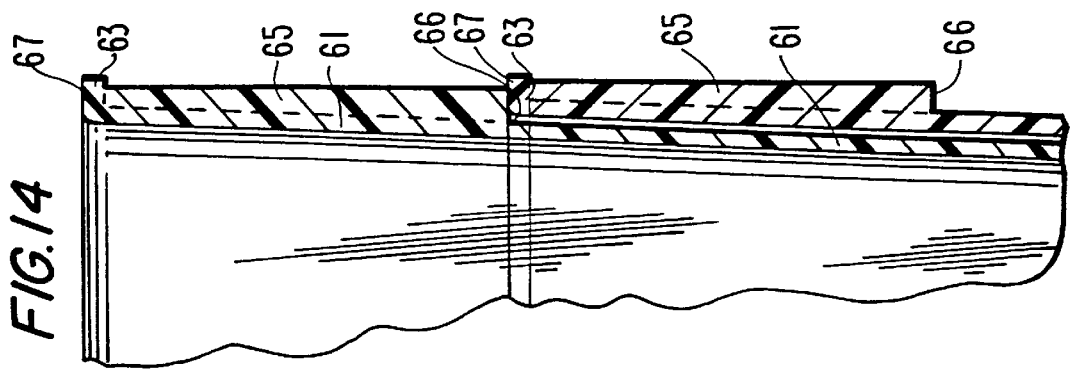
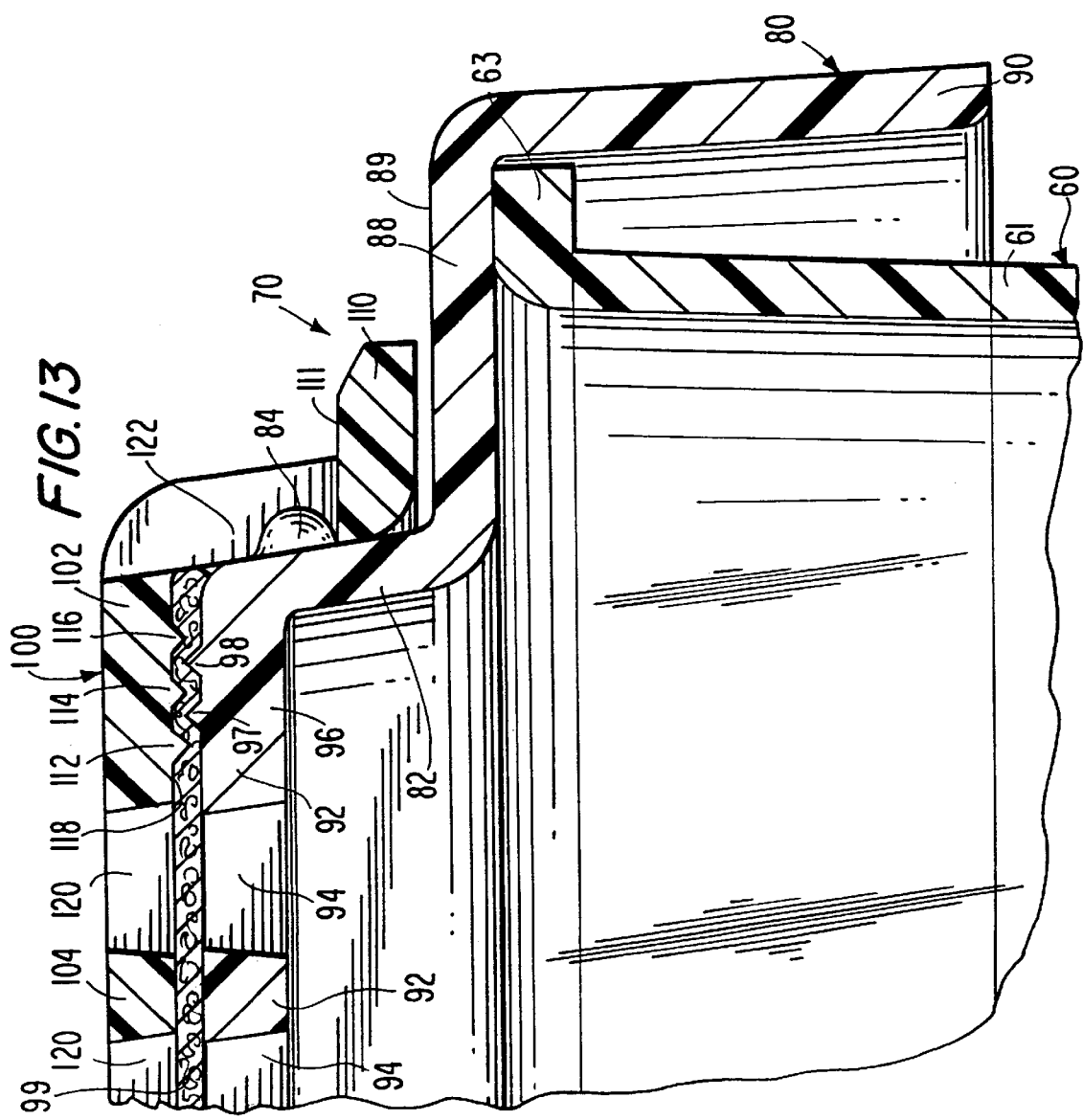

6,158,387

VENTILATED CAGE AND RACK SYSTEM

CROSS REFERENCE TO RELATED APPLICATIONS

This is a Continuation Application of co-dependent U.S. patent application Ser. No. 08/715,657 filed on Sep. 18, 1996, now U.S. Pat. No. 5,954,013.

BACKGROUND OF THE INVENTION

This invention relates generally to ventilated cage and rack system, and more particularly to an open rack system which maximizes both cage density within the rack and useful volume within each cage while providing protection for both personnel attending to the system and animals contained within the cages from contamination.

Ventilated cage and rack systems are well known in the art. One such ventilated cage and rack system is disclosed in U.S. Pat. No. 4,989,545, assigned to Lab Products, Inc., in which an open rack system including a plurality of shelves, each formed as an air plenum, is provided. Air ventilation is provided directly to animals within each cage by allowing air to travel within each shelf to a plurality of predetermined positions within the rack. At least one cage level barrier having a filter bonnet is positioned on a shelf, so that the shelf removes air disposed adjacent the bonnet. A cage guide is formed in substantially the same shape as the bonnet and is affixed to the bottom of the shelf so that when the barrier cage is placed within the ventilated rack, it is positioned within the cage guide. The cage guide is separated from the bonnet by a relatively small distance. The air plenum shelf is provided with a negative pressure to remove gases from above the cage bonnet.

The prior art ventilated cage and rack system was satisfactory. However, because each shelf acted as an air plenum, each shelf required a certain height within the rack to allow for air to travel therethrough. Accordingly, the combined height of each shelf and the cage guides mounted below each shelf limited the vertical stacking density of cages within the rack because each row of cages was vertically separated from adjacent rows in the rack by at least this combined height. Filter caps for animal cages used within ventilated cage and rack systems are also well known in the art. One such filter cap is disclosed in U.S. Pat. No. 4,640,228, assigned to Lab Products, Inc., in which a cap body with a perforated top wall is provided. A sheet of filter material is sandwiched between a retainer and the lower surface of the perforated top wall of the cap body. The retainer is detachably mounted inside the cap body in flush abutment with the filter material placed against the lower surface of the top wall of the cap body. The retainer comprises a narrow border portion and flat cross arms which intersect at an integral central portion.

This prior art filter cap was satisfactory. However, because the retainer was secured to the cap body on the interior of the cap body, changing a filter with an animal within the cage was inhibited because the entire filter cap required removal from the cage to remove the retainer and change the filter. Moreover, because the retainer was substantially open, the bottom side of the filter was substantially exposed to animals within the cage who might damage the filter, rendering it ineffective and resulting in contamination or requiring additional structure such as a wire bar lid for protection of the filter.

Another such filter cap is disclosed in U.S. Pat. No. 4,480,587, assigned to Lab Products, Inc., in which a cap body with an open top portion provided with a ledge and cross arms is provided. A filter is detachably secured to the cap body by an overlaying protective plate member which is fastened over the ledge and cross arms using a plurality of fasteners, such as threaded bolts which pass through holes in the plate member, filter and cap body and secured by respective nuts.

This prior art filter cap was also satisfactory. However, because separate fasteners were used to mount the protective plate to the cap body, personnel changing a filter were required to use special tools to remove the protective plate to release the filter. The use of such tools required additional resources and was time-consuming. Moreover, because the cap body had a substantially open top, the bottom side of the filter in this design was also unprotected from animals within the who might damage the filter and render it ineffective. In addition, the substantially open top inhibited changing a filter with an animal within the cage because of the possibility that the animal could escape through the open top.

Typically, the cages in a rack system must be removable from the rack system to provide access to the animals for feeding and testing, and to the cages for cleaning, maintenance and transport. However, it also required that the rack air source and/or water source mate with the cage to provide air and water to the cage. To accommodate this requirement it is known in the art to provide a structure so that the valve in each cage is connected to an air and/or water plenum on the rack by a coupling system. In such a system, each cage is connected to the plenum by pushing the cage into a rack until the coupling at the rear of the cage is connected to the coupling provided on the plenum. The couplings are disengaged by simply pulling the cage out of the rack, which closes a valve within the plenum coupling to prevent the escape and contamination of water and air. One such system is disclosed in U.S. Pat. No. 5,042,429, assigned to Lab Products, Inc. These prior art animal cage rack systems provide a friction fitting to maintain the connection between the couplings. These couplings have been satisfactory. However, they suffer from the disadvantage that, if the cage is not properly installed in the rack or is accidentally bumped during use, the couplings may become partially or wholly disengaged. In such an event, the water valve may be stuck open, flooding the cage.

Locking mechanisms have been designed to prevent a cage from being accidentally uncoupled from the plenum once the cage is properly installed. However, these prior art designs have been large, cumbersome and expensive. Moreover, modem cage and rack systems must allow cages of various lengths to be accommodated within the rack. The locking mechanisms of the prior art do not easily permit the secure locking of cages of various lengths within the rack.

Accordingly, it is desired to provide a ventilated cage and rack system which maximizes the stacking density of cages within the rack. It is also desired to provide a filter cap for animal cages used in a ventilated cage and rack system which permits easy changing of the filter while an animal is within the cage and which protects the filter in use from damage caused by the animal. It is further desired to provide a simple animal cage rack locking mechanism which enables an operator to lock cages of various lengths within a rack.

SUMMARY OF THE INVENTION

Generally speaking, in accordance with the instant invention, a ventilated cage and rack system which maximizes cage density within the rack is provided. The rack includes at least one air exhaust plenum, and at least one canopy disposed within the rack. The canopy is capable of supporting a first cage within the rack above the canopy, and also positioning a second cage below the canopy so as to maintain a gap between the top of the second cage and the canopy to permit air to be drawn into the air exhaust plenum from the interior of the second cage through the top of the second cage and to also permit ambient air to be drawn across the top of the second cage into the air exhaust plenum.

Generally speaking, in accordance with the instant invention, a filter cap for an open-top cage is further provided. The filter cap includes a substantially rigid bonnet adapted to cover the open top of the open-top cage. The bonnet includes a body portion with a perforated top, and side walls extending therefrom forming an open bottom end. The filter cap also includes a substantially rigid filter retainer sized to fit upon the bonnet and to substantially cover the perforated top of the bonnet. The filter retainer includes a top end with perforations substantially coextensive with the perforations in the top of the bonnet, and side walls extending from the top end of the filter retainer forming an open bottom end, the perforations in the filter retainer being substantially in alignment with the perforations in the bonnet when the filter retainer is mounted on the top of the bonnet. The filter cap further includes securement means for detachably securing the filter retainer to the bonnet to permit enclosure of a sheet of filter material therebetween, the securement means being integrally formed in the bonnet and the filter retainer.

Generally speaking, in accordance with the instant invention, a member for locking a cage within a rack is still further provided. The cage is capable of being inserted into or removed from the rack along a slide path. The member for locking includes a base member and a restraining member rotatably mounted to the base member. The restraining member has a first end and a foot disposed on the first end. The restraining member may be rotated between at least a first position for locking a first cage of a predetermined length within the rack and a second position for locking a second cage of a different size than the first cage within the rack.

Accordingly, it is an object of the invention to provide a ventilated cage and rack system which maximizes the density of cages within a rack.

Another object of the invention is to provide a ventilated cage and rack system which does not require distinct shelving for positioning and supporting cages within the rack and which thereby maximizes the proportion of space within the rack which may be occupied by cages.

A further object of the invention is to provide a ventilated cage and rack system with canopies which position and support cages within the rack without additional shelving and which guide exhaust air drawn from cages within the rack to an air exhaust plenum to remove exhaust air from the rack without contamination of personnel or cross-contamination between cages within the rack.

Still another object of the invention is to provide a filter cap for an open-top cage which permits a filter to be securely mounted yet easily and quickly changed.

A still further object of the invention is to provide a filter cap for an open-top cage which permits replacement of a filter while animals are within the cage and which prevents such animals from escaping during filter replacement.

Yet another object of the invention is to provide a filter cap for an open-top cage which protects the filter from damage caused by animals within the cage.

A yet still further object of the invention is to provide a filter cap for an open-top cage which requires no special tools to replace the filter.

Another object of the invention is to provide a locking mechanism for locking a cage within a rack which is capable of locking cages of a plurality of different sizes within the rack.

Another object of the invention is to provide a locking mechanism for locking a cage within a rack which easily and quickly allows secure locking and unlocking of a cage within the rack with a minimum of effort and a minimum number of parts.

Another object of the invention is to provide a locking mechanism for locking a cage within a rack which is readily visible and allows an operator to easily determine whether a cage is properly secured within the rack.

Still other objects and advantages of the invention will in part be obvious and will in part be apparent from the specifications and drawings.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 8 is a perspective view of a portion of a ventilated cage and rack system constructed in accordance with a fourth embodiment of the present invention;

FIG. 9 is a sectional view taken along the line 8—8 of FIG. 9;

FIG. 10 is an exploded perspective partial view of a cage level barrier cage constructed in accordance with the present invention;

FIG. 11 is a top plan view of a filter cap for an open-top cage constructed in accordance with the present invention;

FIG. 12 is a sectional view taken along the line 12—12 of FIG. 11;

FIG. 13 is a sectional view taken along the line 13—13 of FIG. 11;

FIG. 14 is a sectional view of two stacked cage bottoms constructed in accordance with the present invention;

DETAILED DESCRIPTION OF THE PREFERRED EMBODIMENTS

Figure 1:
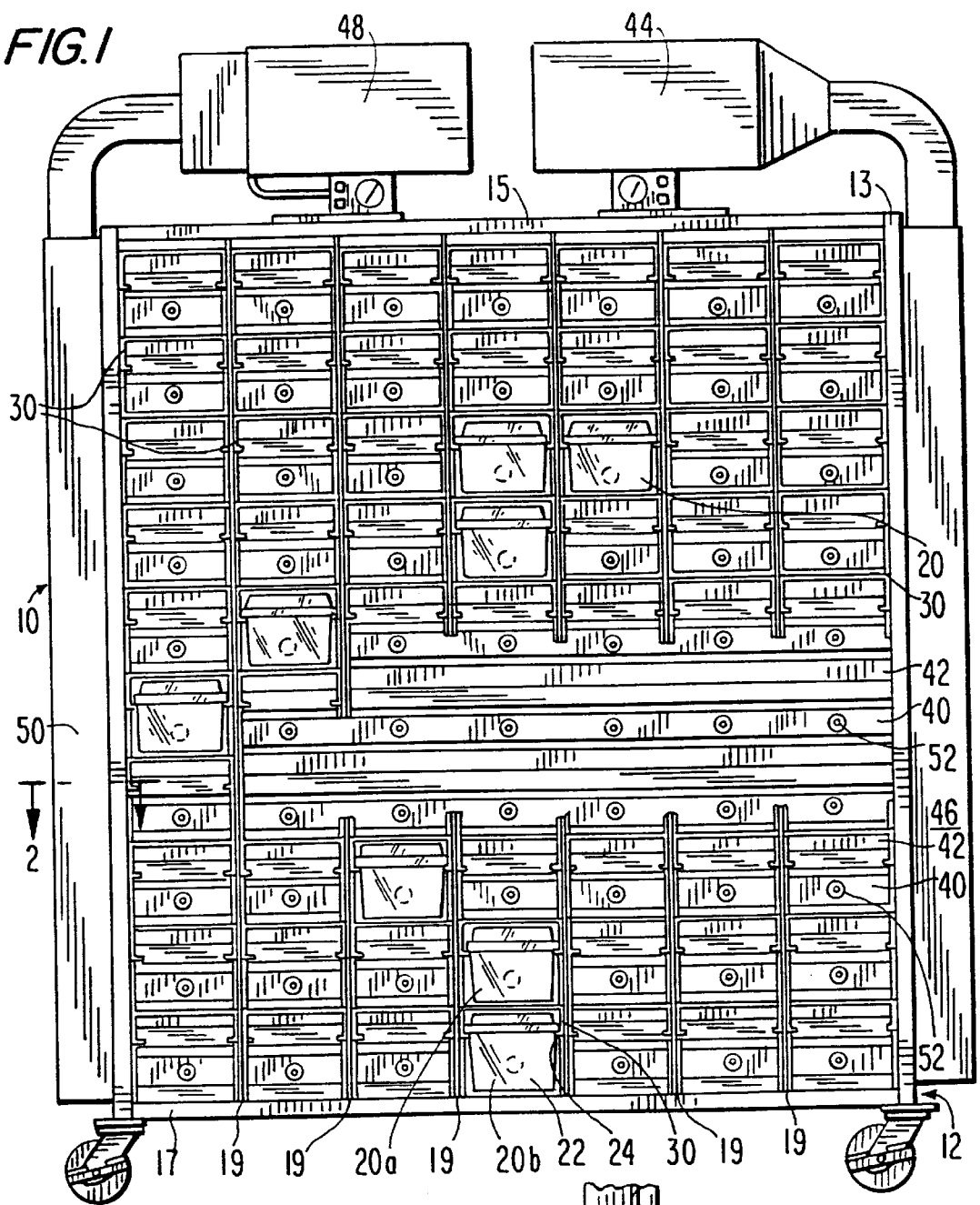
FIG. 1 is a front elevational view, with partial cutaway, of a ventilated cage and rack system constructed in accordance with the present invention.
Figure 2:
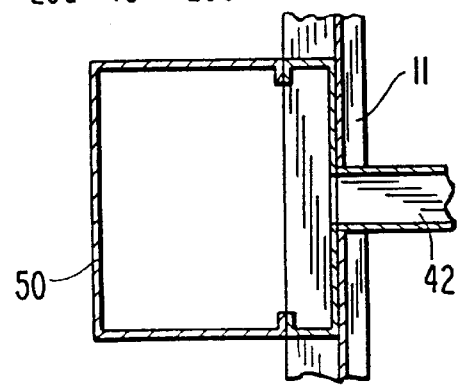
FIG. 2 is a sectional view taken along the line 2—2 of FIG. 1.
Figure 3:
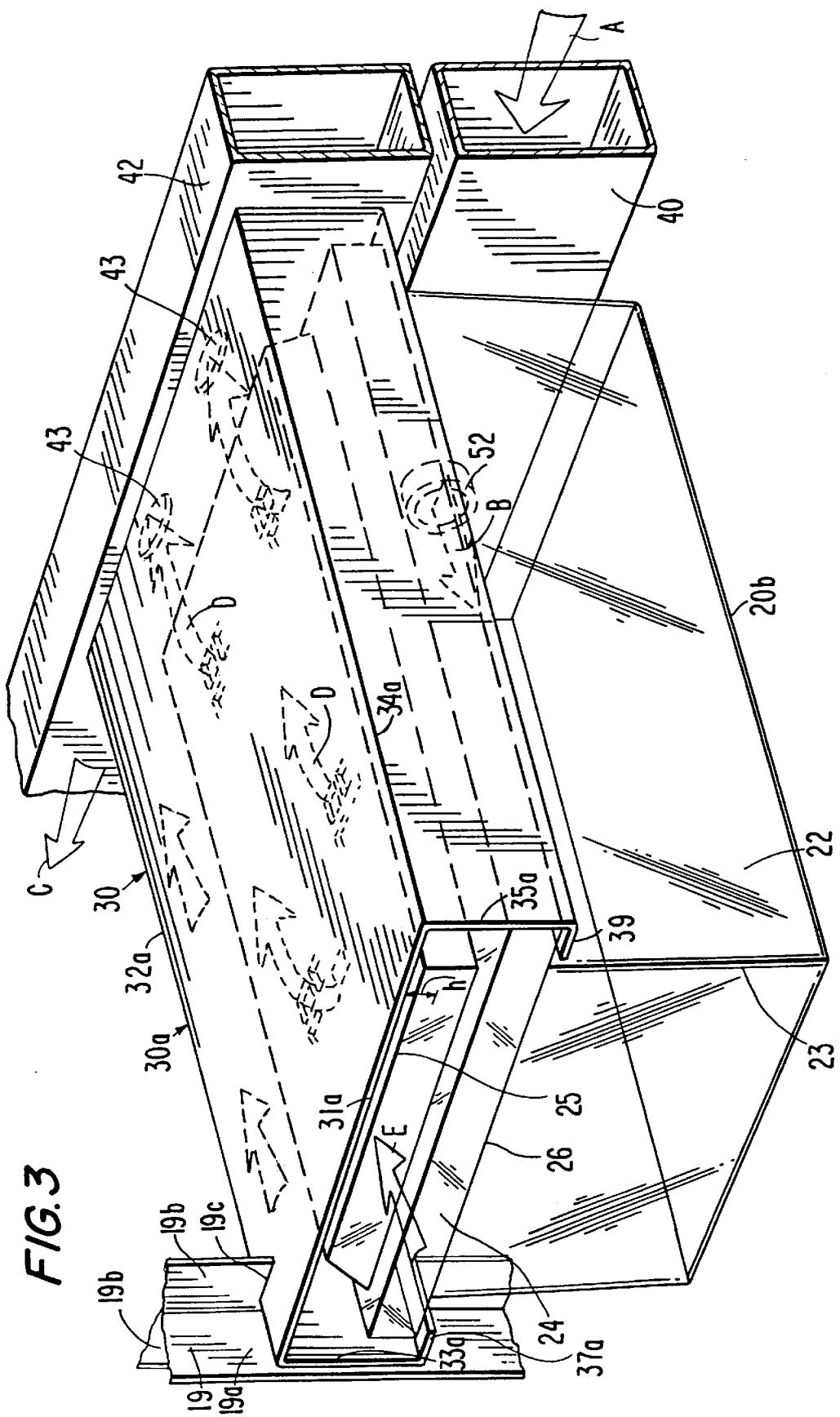
FIG. 3 is a perspective view, partially in phantom, of a cage with a filter cap positioned within a ventilated cage and rack system constructed in accordance with the present invention.

Reference is first made to FIGS. 1–3, wherein a ventilated cage and rack system, generally indicated at 10, constructed in accordance with the invention is shown. Ventilated cage and rack system 10 includes an open rack 12 having a left side wall 11 and a right side wall 13, a top 15, and a bottom 17. A plurality of posts 19 are disposed in parallel between top 15 and bottom 17. Vertical posts 19 are preferably narrow and may comprise walls extending substantially from the front of rack 12 to the rear of rack 12, or may each comprise two vertical members, one at or near the front of rack 12 and the other at or near the rear of rack 12.

Ventilated cage and rack system 10 also includes a plurality of air supply plena 40 and air exhaust plena 42 alternately disposed in parallel between left side wall 11 and right side wall 13 substantially in the rear of rack 12. Air is forced into air supply plena 40 by a blower 44 through an air supply conduit 46, said air supply conduit 46 communicating with each air supply plenum 40 through a side wall of the rack 12. Blower 44 preferably contains an air filter for supplying filtered to rack 12. Air is withdrawn from air exhaust plena 42 by a vacuum 48 through air exhaust conduit 50, said air exhaust conduit 50 communicating with each air exhaust plenum 42 through a side wall of the rack 12.

A plurality of cage level barrier cages (cages 20) may be positioned within rack 12. Each cage is formed of a gas impermeable bottom portion 22 having an upstanding sidewall 23 and a filter cap 24. Filter cap 24 may have an overhang 26 which extends over the top end of bottom portion 22. Filter cap 24 is preferably a filter cap as described in more detail below, but may also be a filter cap as known in the art, such as the filter caps disclosed in U.S. Pat. Nos. 4,480,587 and 4,640,228, assigned to Lab Products, Inc.

Cages 20 are positioned within rack 12 by canopies generally indicated at 30. Each canopy 30 shrouds a cage 20b below a canopy 30. Accordingly, each canopy 30 is shaped and positioned so as to substantially surround the filter cap 24 of the cage 20b while maintaining a short gap h between a top 25 of filter cap 24 and canopy 30. Gap h should be sufficient to allow movement of gases between canopy 30 and filter cap 24, and in an exemplary embodiment gap h is 3/16 of an inch to 1/4 of an inch. Canopy 30 profiles filter cap 24 and overlaps overhang 26 of filter cap 24, preferably creating a tension fit against the sidewall 23 of bottom portion 22 of cage 20b. The rear of canopy 30 is attached to air exhaust plenum 42.

Canopies 30 are disposed in parallel columns in rack 12 between each pair of adjacent posts 19, or between left side wall 11 and an adjacent post 19, or between right side wall 13 and an adjacent post 19. Each canopy 30 supports a first cage 20a above the canopy 30 in the rack 12 and shrouds the filter cap 24 of a second cage 20b below the canopy 30 in the rack 12. The bottom portion 22 of the first cage 20a rests on top of the corresponding canopy 30. Of course, those canopies positioned at the top row of rack 12 do not support a cage 20 above them, and those cages 20 positioned on the bottom row of rack 12 are preferably supported by bottom 17 of rack 12. When positioned in the rack, each cage 20 communicates with air supply plenum 40 through a cage coupling 52. Such cage couplings are known in the art, and are disclosed, for example, in U.S. Pat. Nos. 4,989,545 and 5,042,429 assigned to Lab Products, Inc. Air supply plena 40 may also include means for delivering a supply of water to cages 20 through cage coupling 52, as is also known in the art. Canopies 30 are preferably constructed of a lightweight, transparent material which is substantially rigid, such as clear plastic. Such clear plastic canopies provide enhanced visibility of cages 20 within rack system 10 and reduce the overall weight of rack system 10.

Referring in particular to FIG. 3, a cage 20 is positioned within rack 12 and coupled to the air supply plenum 40 through cage coupling 52. Blower 44 forces air into the air supply plenum 40 in the direction of arrow A, and air is consequently forced into cage 20 through cage coupling 52 in the direction of arrow B to supply air to animals within the cage. Vacuum 48 withdraws air from air exhaust plenum 42 in the direction of arrow C, thereby creating a negative pressure within the air exhaust plenum 42. Ducts 43 are formed in air exhaust plenum 42 below the position at which canopy 30 is attached and communicating with gap h, permitting air below canopy 30 in gap h to be drawn into air exhaust plenum 42 causing a negative pressure within the space defined by canopy 30. Thus, air is drawn from the cage 20 below the canopy 30 through filter top 24 in the direction of arrows D and into the air exhaust plenum 42. Ambient air from the room in which rack 12 is situated is also drawn across the top 25 of filter cap 24 through the open front of canopy 30 in the direction of arrow E.

Since canopy 30 effectively surrounds filter cap 24 including overhang 26, canopy 30 effectively isolates filter cap 30 from the remainder of the cage 20 which it covers, as well as from the remainder of cages 20 within the rack 12. Accordingly, any gases passing from cage 20 around or underneath overhang 26 remain within canopy 30 until removed by air exhaust plenum 42 through ducts 43. Additionally, because overhang 26 is contained within canopy 30 when cage 20 is positioned therein, contamination due to gas exchange between adjacent cages is severely reduced. By providing a ventilated rack and cage system utilizing a negative pressure air exhaust plenum in which air is drawn from a small confined space provided by the canopies 30 and filter tops 24, an open ventilated rack is provided which also provides for personnel protection as well as animal protection.

Referring to FIG. 3, a first embodiment of canopy 30, generally indicated at 30a, comprises a top plate 31a. Top plate 31a extends from the air exhaust plenum 42 above ducts 43 at least the length of filter cap 24 of a cage 20 positioned beneath the canopy 30a, as well as at least to the front end of the bottom portion of a cage 20 positioned above the canopy 30a. Top plate 31a is preferably as long as a cage 20 itself, including filter cap 24. Canopy 30a further comprises a left side plate 33a and a right side plate 35a which each depend substantially perpendicularly from opposite side edges 32a and 34a of top plate 31a. Side plates 33a and 35a are preferably disposed at a distance from each other which is substantially the same as or slightly greater than the width of filter cap 24. Canopy 30a also comprises lips 37a and 39a which each extend perpendicularly from side plates 33a and 35a respectively toward cage 20. Lips 37a and 39a are disposed so as to extend underneath at least a portion of the overhang 26 of filter cap 24. Lips 37a and 39a are substantially parallel to top plate 31a and are each preferably disposed at a distance from top plate 31a which is substantially the same as or slightly greater than the height of filter cap 24 plus gap h. In this manner, any gases escaping from overhang 26 are held in the canopy by lips 37a and 39a and will be drawn away through ducts 43 in air exhaust plenum 42 at the rear of canopy 30a.

Canopy 30a is preferably mounted to air plenum 42 at the rear and to two posts 19 at the front of rack 12. Each post 19 preferably comprises a vertical T-beam, with a first face 19a being disposed substantially parallel to the direction of insertion of a cage 20 into rack 12 (which is parallel to the direction indicated by arrow E), and a second face 19b being disposed substantially perpendicular to said direction of insertion. Each side of face 19b is provided with notches 19c for supporting canopy 30a therein. To maximize horizontal cage density within rack 12, notches 30a preferably extend as close to face 19a as possible, and face 19a of post 19 is preferably made as narrow as possible while still providing structural support for rack 12. By providing such a notched T-beam post 19 on each side of canopy 30a, canopy 30a may be supported on both sides from the front of rack 12. Other means of providing the support of posts 19 are contemplated by the invention. For example, a notched L-beam post 19 could be used, thereby providing support to only one side of canopy 30a from the front of the rack, or canopies 30a could be screwed to a flat vertical panel disposed parallel the cage insertion direction and extending from the top to the bottom of rack 12.

Figures 4, 5:
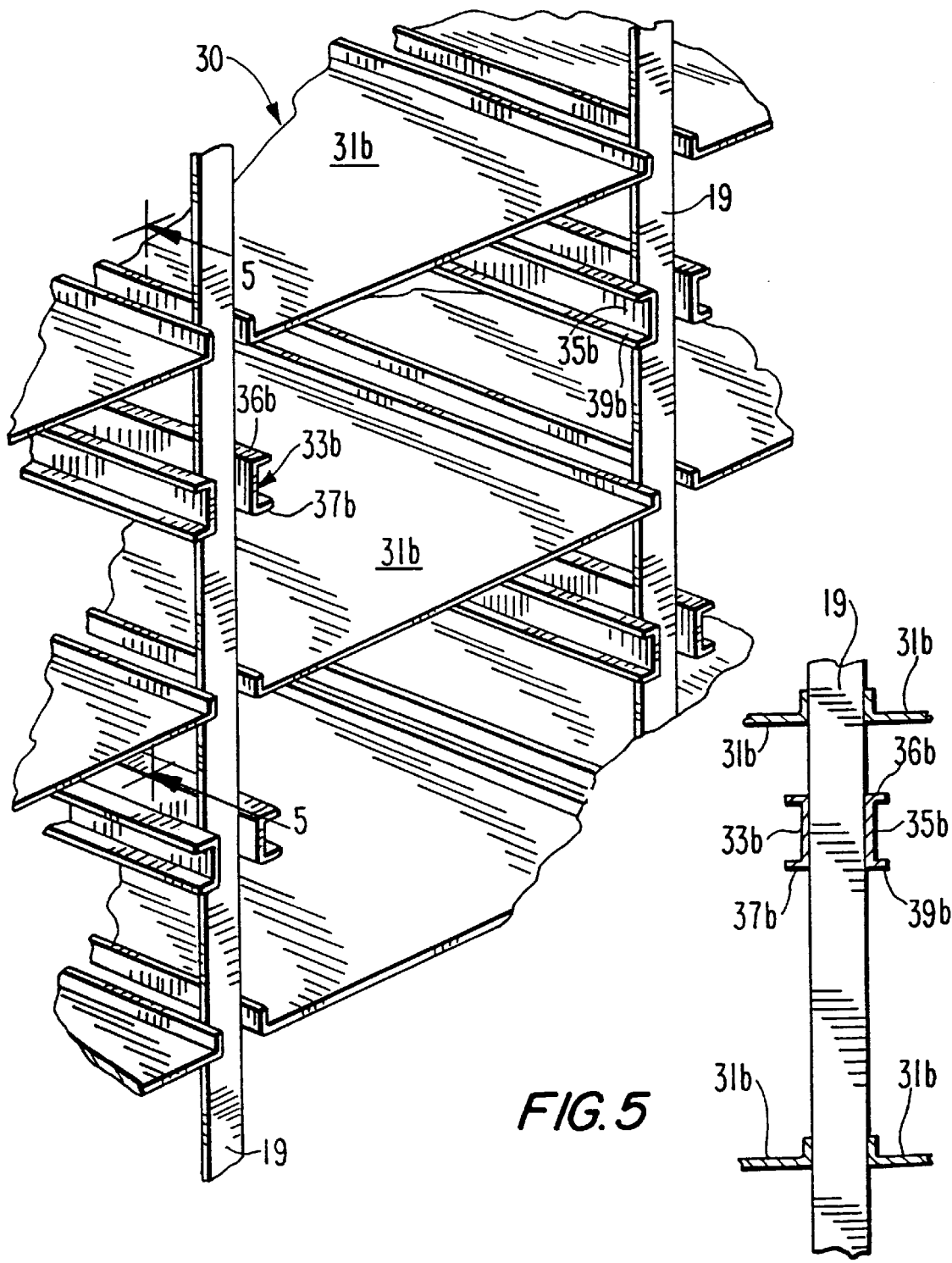
FIG. 4 is a perspective view of a portion of a ventilated cage and rack system constructed in accordance with a second embodiment the present invention.
FIG. 5 is a sectional view taken along the line 5—5 of FIG. 4.

A second embodiment of canopy 30, generally indicated at 30b, is shown in FIGS. 4 and 5. Instead of forming canopy 30 as a unitary member, canopy 30b comprises a top plate 31b and distinct left and right side guides 33b and 35b. Side guides 33b and 35b include lips 37b and 39b respectively, and side guides 33b and 35b, as well as lips 37b and 39b, serve substantially the same function as the side guides and lips of the first embodiment of the canopy 30a. Top plate 31b and side guides 33b and 35b may be mounted to air exhaust plenum 42 and posts 19 in the same manner as described in the first embodiment of the canopy 30a. In addition, side guides 33b and 35b may each be provided with a catch 36b extending toward filter cap 24 when a cage 20 is in position within canopy 30b so as to hold filter cap 24 more securely in place upon the bottom portion 22 of cage 20. Catch 36b may strengthen the seal between filter cap 24 and bottom portion 22 of cage 20. Catch 36b also prevents animals within the cage from pushing filter cap 24 upwards, which could comprise the seal between filter cap 24 and bottom portion 22, and which could also close gap h thereby disrupting the clean flow of air between top plate 31b and top 25 of filter cap 24.

Figure 6:
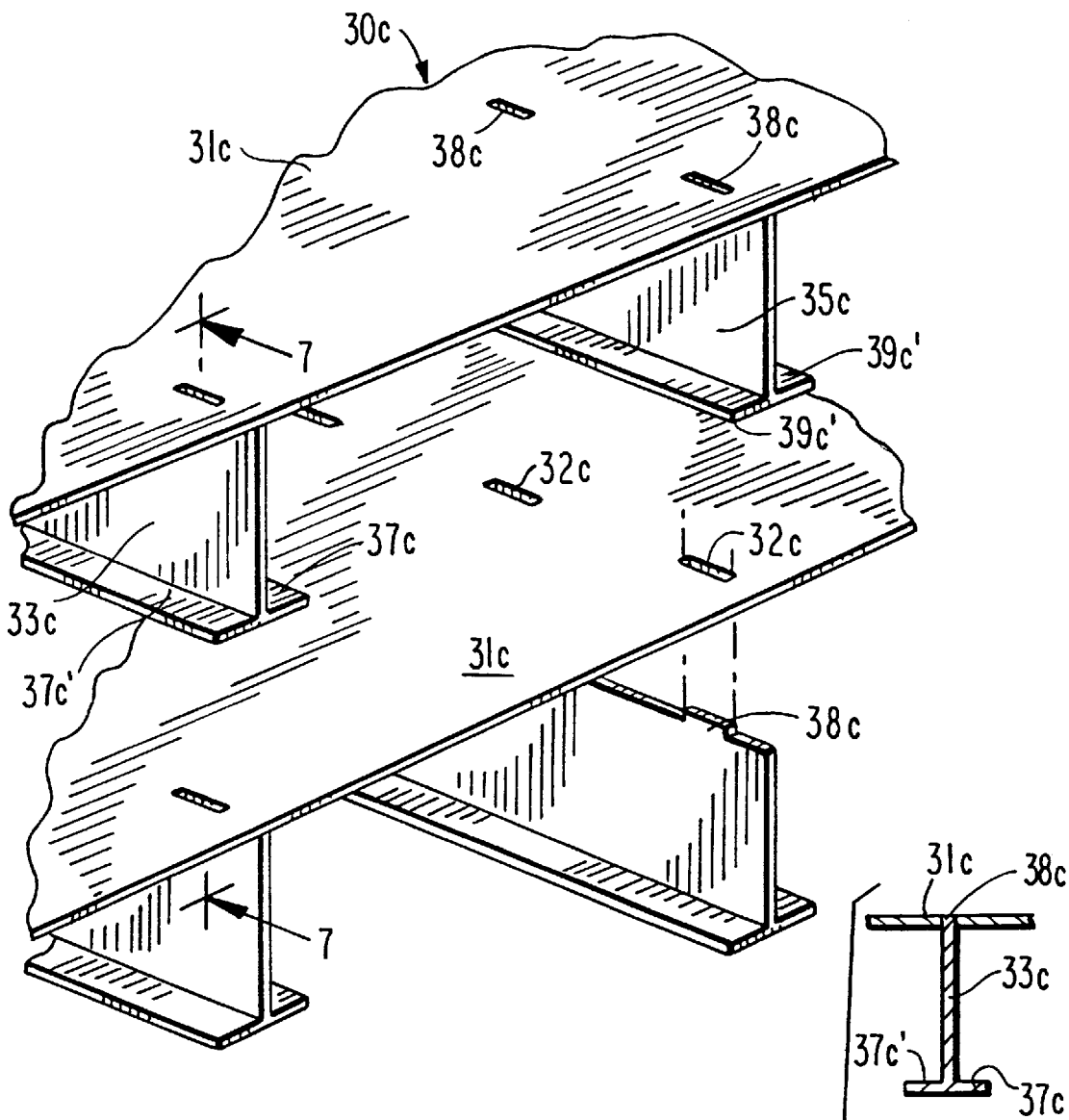
FIG. 6 is a perspective view of a portion of a ventilated cage and rack system constructed in accordance with a third embodiment of the present invention.
Figure 7:
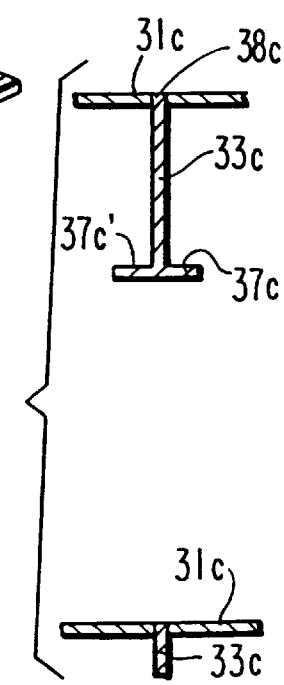
FIG. 7 is a sectional view taken along the line 7—7 of FIG. 6.

A third embodiment of canopy 30, generally indicated at 30c, is shown in FIGS. 6 and 7. Canopy 30c comprises a top plate 31c which serves as a top plate for all canopies 30c in the same row within rack 12. Side guides 33c and 35c are provided for each cage 20 positioned within canopy 30c. Side guides 33c and 35c preferably include tabs 38c which are aligned within slots 38c of top plate 31c, and side guides 33c and 35c are preferably welded to top plate 31c. Side guides 33c and 35c include respective first lips 37c and 39c protruding toward a cage 20 positioned between side guides 33c and 35c and form a canopy with top plate 31c. Side guides 33c and 35c, as well as lips 37c and 39c, serve substantially the same function as the side guides and lips of the first embodiment of the canopy 30a. Top plate 31c and side guides 33c and 35c may be mounted to air exhaust plenum 42 in the same manner as described in the first embodiment of the canopy 30a. In addition, side guides 33c and 35c each include second lips 37c' and 39c' which each extend in a direction opposite that of first lips 37c and 39c respectively. Lips 37c' and 39c' thus serve as corresponding lips 39c and 37c respectively of the canopies to the left and right of canopy 30c if such adjacent canopies exist in rack 12 (i.e. unless canopy 30c is in the leftmost or rightmost column of the rack 12). By providing a single structure which serves as a side guide for two adjacent cages, less horizontal space is required for canopies 30c in rack 12 and the horizontal stacking density of cages 20 in the rack may be increased.

A fourth embodiment of canopy 30, generally indicated at 30d, is shown in FIGS. 8 and 9. Canopy 30d comprises a top plate 31d which serves as a top plate for all canopies 30d in the same row within rack 12. Side guides 33d and 35d are provided to form the canopy with top plate 31d for each cage 20 positioned below canopy 30d. Side guides 33c and 35c preferably include flanges 36d which are welded to top plate 31d. Side guides 33d and 35d include respective first lips 37d and 39d protruding toward a cage 20 positioned between side guides 33d and 35d. Side guides 33d and 35d, as well as lips 37d and 39d, serve substantially the same function as the side guides and lips of the first embodiment of the canopy 30a. Top plate 31d and side guides 33d and 35d may be mounted to air exhaust plenum 42 in the same manner as described in the first embodiment of the canopy 30a. In addition, side guides 33d and 35d are each mounted flush against a side guide of an adjacent canopy in the rack 12, preferably by welding. By providing flanges for mounting the side guides to the top plate, and by mounting adjacent side guides directly to one another, a stronger and more rigid overall rack 12 may be achieved while simultaneously maximizing cage density within the rack.

Accordingly, because each canopy 30 acts as both a support for the cage 20 above it in rack 12 as well as a shroud over the filter cap of the cage 20 below it in rack 12 which guides exhaust air from the cage as well as ambient air into the air exhaust plenum 42, additional shelving is not needed to position and support cages 20 within rack 20. As a result, cages 20 may be vertically positioned closer together in rack 12 than in a rack having distinct shelving, thereby advantageously increasing the stacking density of cages 20 within rack 12.

Reference is now made to FIGS. 10–13, in which a filter cap, generally indicated at 70, for an open-top cage, such as cages 20 described above, constructed in accordance with the invention is shown. Filter cap 70 is configured to cover the top of a cage bottom, generally indicated at 60. Cage bottom 60 is formed with integral side walls 61, a bottom wall or floor (not shown) and an open top end. The walls are preferably formed of a clear transparent plastic such as polycarbonate, which is rigid, durable, permits ready inspection of animals, has a high impact strength, and is machine washable or autoclavable at temperatures under 250 degrees Fahrenheit. Such a cage is conventional, commercially available, and widely used. A standard absorbent bedding of particulate material such as wood chips (not shown) may be spread on the floor. The open top of cage bottom 60 is bordered by peripheral lip 63 which extends continuously therearound. Cage bottom 60 may also include corner stacking tabs 65 for added structural support and for stacking a plurality of cages bottoms as shown in FIG. 14.

Filter cap 70 may be formed as a layered construction including a bonnet, generally indicated at 80, in the general shape of a shallow tray or box, a retainer 100, and a filter 99 therebetween. Bonnet 80 is preferably formed of clear plastic which is substantially rigid but permits a modest degree of flexure when torsional forces are applied thereto. As shown in FIGS. 10–13, filter cap bonnet 80 has a perforated top wall 92 which is integrally molded with a marginal narrow border 96 extending continuously around the top of filter cap bonnet 80. Top wall 92 is provided with a plurality of perforations 94, preferably of generally square configuration and forming a grid array. Respective opposed pairs of side walls 82 depend substantially orthogonally from top wall 92. The surface formed on bonnet 80 for resting filter cap 70 on cage bottom 60 includes a continuous lateral peripheral flange 88 extending generally perpendicularly outwardly from side walls 82. A continuous peripheral flange 90 depends from lateral peripheral flange 88 to encompass the open top of cage bottom 60. Ribs 86 extend from flange 90 to allow stacking of the bonnet 80.

As shown in FIG. 12, flange 90 is spaced from, encompasses and overhangs lip 63 of cage bottom 60. Thus, filter cap bonnet 80 cannot be inadvertently dislodged from cage bottom 60 and must be lifted off to be removed. It should also be noted that the clearance space between flange 90 and lip 63 should permit only a slight movement of filter cap 70 on cage bottom 60. However, peripheral flange 88 is preferably of sufficient lateral extent to remain in contact with lip 63 despite any relative lateral movement between filter cap 70 and cage bottom 60, thereby maintaining the integrity of the "petri dish" configuration between filter cap 70 and cage bottom 60.

Filter cap 70 is also provided with a filter retainer 100. Filter retainer 100 is preferably formed of material having the same properties as those of bonnet 80 described above but with a different rigidity. Filter retainer 100 detachably and securely maintains an air filter 99 to the top surface of top wall 92. Filter retainer 100 includes a generally flat perforated top wall 104. Top wall 104 includes a substantially rectangular border portion 102. An outer edge 106 of border portion 102 is joined to integrally molded side walls 108 which depend therefrom and extend continuously from top wall 104, and which closely fit side walls 82 of filter cap bonnet 80, as shown in FIGS. 12 and 13. A lateral peripheral flange 110 extends from side walls 108. Ribs 86 extend from the respective corners of filter retainer 100 and provide structural integrity. Additionally, ribs 86 act as stacking guides for positioning a top bonnet 80 of a second filter cap 70 atop first filter cap 70. The top surface of border portion 96 of bonnet 80 is provided with a pair of spaced-apart integrally molded ribs 97, 98 which extend continuously therearound. Each rib 97, 98 has a generally convex cross-section as shown in FIGS. 12 and 13, and the ribs are disposed to project between a group of three similarly-shaped spaced-apart ribs 112, 114, 116, which are integrally molded on a bottom surface 118 of filter retainer border 102.

In a preferred embodiment, air filter 99 is a thin sheet of spun-bonded polyester of the type sold by DuPont under the trademark REEMAY 20 24. A filter thickness of between 11 and 13 mils has been found adequate for a filter having an area approximately equivalent to the area of filter cap top wall 92. Air filter 99 is mounted on the top surface of filter cap bonnet 80 and is held in place by filter retainer 100 in a manner to be now described. REEMAY 20 24 is used by way of example only and any filter medium having at least its properties or similar properties may be utilized.

To assemble filter cap 70, air filter 99 is placed against the bottom surface of top wall 104 of filter retainer 100. Thereafter, filter cap bonnet 80 is mounted atop filter retainer 100. Ribs 97, 98, 112, 114, 116 interlock such that rib 97 projects between ribs 112 and 114, while rib 98 projects between ribs 114 and 116, as shown in FIGS. 12 and 13. Ribs 97, 98, 112, 114, 116 thus also serve to hold filter 99 securely in place against the top surface of top wall 92. Top wall 104 of filter retainer 100 is provided with perforations 120 which are preferably substantially coextensive and in alignment with perforations 94 in top wall 92 of bonnet 80 when filter retainer 100 is mounted atop bonnet 80. The mesh structure of top wall 92 serves to prevent air filter 99 from sagging and holds air filter 99, while filter retainer 100 holds filter 99 securely in place against the top surface of top wall 92. In the assembled filter cap 70, perforated top wall 104 overlies filter 99 to protect the filter against damage during handling and prevent its movement or buckling, while filter 99 rests flush upon perforated top wall 92 of bonnet 80 which supports and protects air filter 99 in its mounted position. Additionally, touching the filter with fingers may destroy the filter integrity, and therefore the perforated walls on either side of the filter prevent contact with the filter by the technician during handling and also prevents contact with the filter by the animal, removing the necessity for a wire bar lid and increasing the useable volume of the cage.

Filter retainer 100 is held in place by means of small projections or detents 84 which are integrally molded on the outer surface of side walls 82 of filter cap bonnet 80. As shown in FIG. 11, four spaced detents 84 are molded on each long side wall 82 of bonnet 80, and two spaced detents 84 are molded on each shorter side wall 82. Each of the detents 84 has a convex or arcuate free end, as shown in FIG. 13. Similarly, apertures or slots 122 are formed in side walls 108 of filter retainer 100 which are positioned and dimensioned so as to snugly receive detents 84 when filter retainer 100 is mounted on bonnet 80. In an alternative embodiment, detents 84 could be formed on the inner surface of side walls 108 of filter retainer 100, while slots 122 would be formed in side walls 82 of bonnet 80. It is also possible to dimension filter retainer 100 to be held to bonnet 80 by a tension fit.

Detents 84 are precisely molded on bonnet 80 and are spaced from top surface 89 of peripheral flange 88 by a distance slightly greater than the height of integral peripheral flange 110 of the filter retainer 100. After air filter 99 has been positioned against the bottom surface of top wall 104, filter cap bonnet 80 is moved downwardly upon filter retainer 100 toward the perforated top wall 104 thereof to permit detents 84 to engage slots 122. Side walls 108 of filter retainer 100 flex outwardly so that slots 122 snap past tabs 84 to the mounted position shown in FIGS. 11–13. In this mounted position, the top surface 111 of lateral peripheral flange 110 is held beneath the bottom surface of detents 84 and is restrained thereby, with ribs 112, 114 and 116 on the bottom surface of border portion 102 engaging the top surface of the edge portion of air filter 99 and pressing this filter portion against ribs 97 and 98 of filter cap bonnet border portion 96. At the same time, the meshed structure of perforated top wall 104 of filter retainer 100 engages the top surface of air filter 99 and presses filter 99 firmly against the top surface of top wall 92 of bonnet 80. Air filter 99 is thus sandwiched between filter retainer 100 and the top surface of top wall 92 of bonnet 80, and may be retained in this mounted position by the engagement of detents 84 upon flange 110 of filter retainer 100. Furthermore, the mesh structure of top wall 92 protects air filter 99 by forming a rigid barrier between animals within the cage and air filter 99. To this end, it is preferable that perforations 94 are sufficiently small, the thickness of top wall 92 sufficiently great, to prevent an animal within the cage from causing substantial damage to air filter 99. Filter cap bonnet 80, retainer member 100 and air filter 99 may thus be firmly locked in a mounted position so that they cannot be accidentally dislodged during autoclaving or handling. An assembled filter cap 70 can thus be lifted and removed from cage bottom 60 for all normal functions such as feeding, treating or examining animals therein without disturbing or dislodging air filter 99.

Perforated top walls 92 and 104 permit rough handling of filter cap 70 without causing damage to filter 99, and the entire filter cap can be autoclaved as a unit for continual reuse. Since flange 90 closely envelops the open top of cage bottom 60, there is minimal loss of space in a cage rack when cages are in close proximity to each other, and the abutting of one filter cap 70 against another filter cap 70 is unlikely to dislodge the filter caps from their respective cages.

When it becomes necessary to replace or remove filter 99 from filter cap 70, one must merely grasp opposing sides of the perimeter of bonnet 80, such as at lateral peripheral flange 88, and twist or flex filter cap 70. One of the bonnet 80 or retainer 100 is more rigid than the other. Due to the different degrees of flexure inherent in bonnet 80 and filter retainer 100 imparted by the materials from which they are constructed, bonnet 80 and filter retainer 100 will flex relative to each other when a torsional, twisting force is applied to filter cap 70. Furthermore, this flexure will cause ribs 86 of retainer 100 to push against surface 88 of bonnet 80 pushing retainer 100 away from bonnet 80. As a result of this force, lateral peripheral flange 110 of filter retainer 100 will be forced upwards and over detents 84 of bonnet 80, thereby releasing filter retainer 100 from bonnet 80 and exposing air filter 99. Once a new filter 99 is replaced on top wall 104 of retainer 100 as described above, filter bonnet 80 is then replaced and snapped into its mounted position to secure the new filter. In this way, filter 99 can be changed with a minimum amount of time and effort.

By providing a filter cap for an open-top cage with a perforated filter retainer which snaps onto a similarly perforated bonnet, a filter for an animal cage top may be easily and quickly changed. By providing the filter above the perforated top wall of the bonnet, the filter may be replaced while the bonnet is on the cage to ensure that animals within the cage are not permitted to escape while the filter is being replaced. In addition, the substantially rigid mesh structure of the top wall of the bonnet protects the filter from damage caused by animals within the cage, and a separate guard for the filter, such as a wire bar lid, is not necessary. Moreover, by securing the filter retainer to the bonnet with an integrally formed securement means, such as tabs and slots, no special tools are necessary to remove the filter retainer for replacing the filter.

Reference is now made to FIGS. 3 and 14, in which a particular configuration of an animal cage is shown which serves to maximize the number of animals which may be maintained in a cage rack system of a given size. Each cage is required to provide a predetermined square area per animal contained in the cage. It is possible to increase the area within the cage by extending the length of the cage, the depth of the cage. By providing increasing the bottom area by extending the cage, it is possible to increase the number of animals within the cage without increasing the associated width or height so that rack and canopy systems as described above can accommodate both the conventional cage and the new larger cage.

Reference is now made to FIGS. 15–21, wherein a locking mechanism, generally indicated at 150, constructed in accordance with the present invention to retain both sized cages is depicted. Locking mechanism 150 locks a cage 130 within a rack system 140. Cage 130 is removably disposed within rack system 140 along a slide path, generally indicated by arrow F. Cage 130 is preferably a cage 20 including a filter cap 70 as discussed above, and rack system 140 is preferably a ventilated cage and rack system 10 as also discussed above.

Locking mechanism 150 includes a base member 160 and a restraining member 170. Restraining member 170 is rotatably attached to base member 160. Base member 160 is attached to rack system 140. In the locking mechanism 150 discussed above, base member 160 is disposed in a locking position such that foot 174 of restraining member 170 is interposed within the slide path of cage 130 to lock cage 130 within rack system 140. Base member 160 is preferably rotatably attached to rack system 140 so as to be rotatable between a locking position shown in FIG. 21, in which cage 130 is secured and locked within rack system 140, and an unlocked position shown in phantom in FIG. 21, in which cage 130 is unlocked from rack system 140 and may be freely inserted into or removed therefrom. The locking position is also shown in FIGS. 15–17, 19 and 20.

Figure 16:
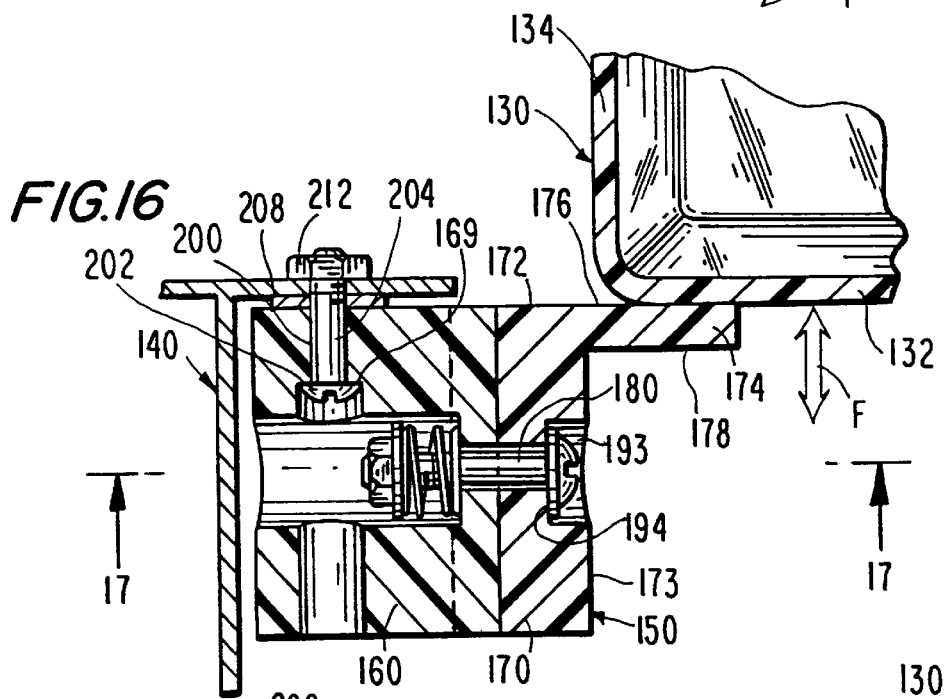
FIG. 16 is a sectional view taken along the line 16—16 of FIG. 15.
Figure 18:
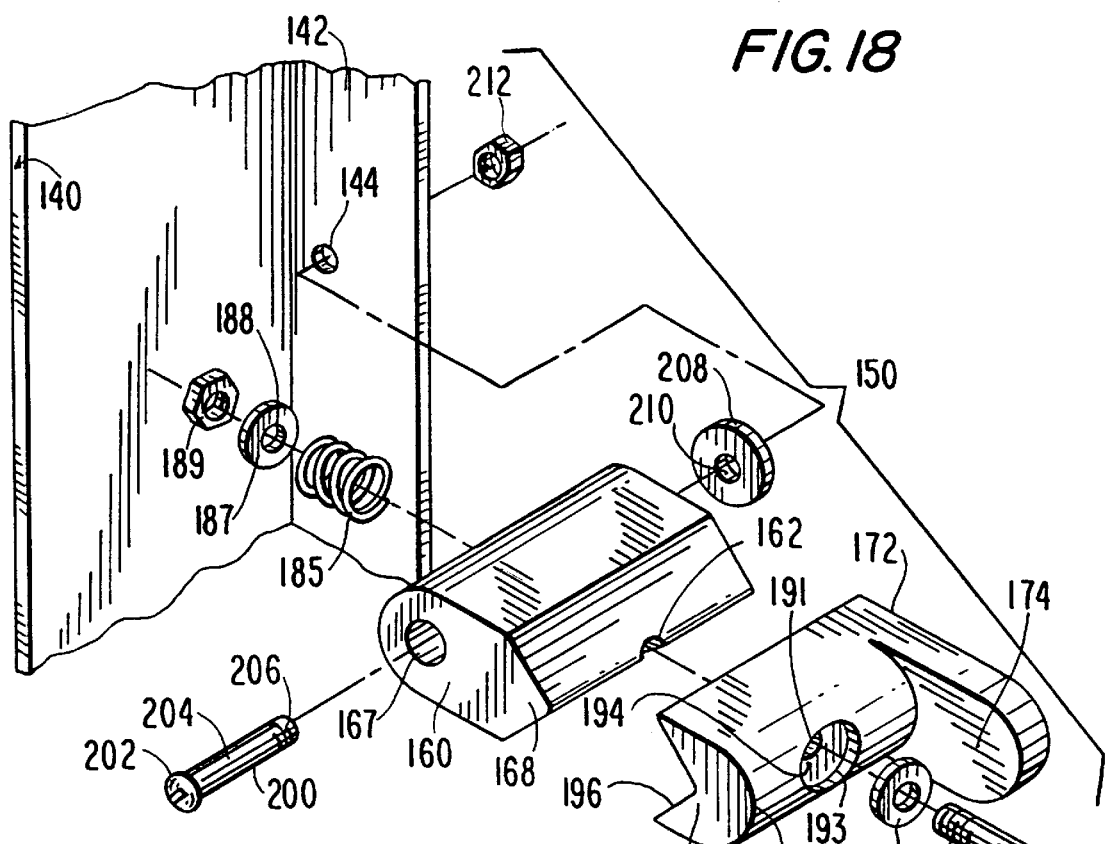
FIG. 18 is an exploded perspective view of a member for locking a cage within a rack constructed in accordance with the present invention.
Figure 20:
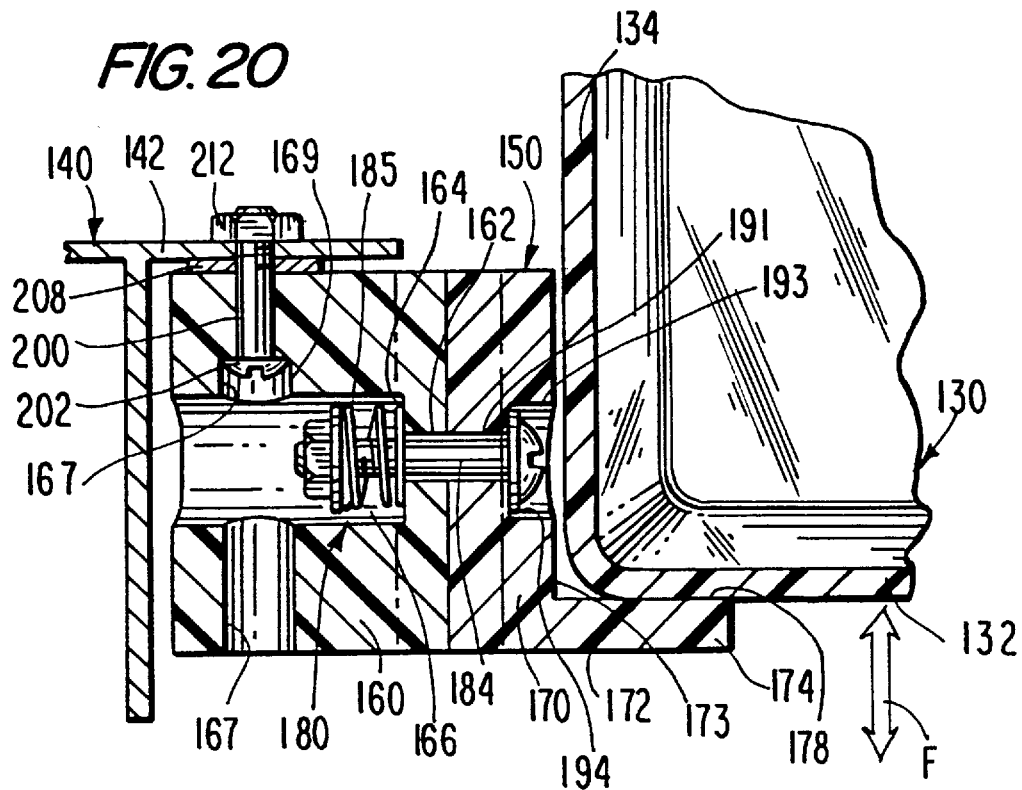
FIG. 20 is a sectional view taken along the line 20—20 of FIG. 19.

To permit rotation of base member 160 between the locking and unlocked positions with respect to rack system 140, base member 160 is preferably rotatably attached to a vertical post 142 of rack system 140, such as vertical post 19 of ventilated cage and rack system 10 discussed above. As best shown in FIGS. 16, 18 and 20, base member 160 is preferably mounted to a portion of post 142 which is perpendicular to the slide path of cage 130. Base member 160 is preferably mounted to post 142 utilizing a bolt 200, a washer 208 and a nut 212. Bolt 200 comprises a shaft 204 bounded by a head 202 at one end and a threaded portion 206 at the other end. Bolt 200 passes through a hole 167 in base member 160. A shoulder 169 in hole 167 engages head 202 and prevents further movement of bolt 200 toward post 142. Bolt 200 next passes through a hole 210 in washer 208, and thereafter through a hole 144 in post 142. Finally, nut 212 is screwed onto threaded portion 206 of the end of bolt 200. Washer 208 preferably comprises a compressible material, such as rubber, so that nut 212 may be tightened to a degree which holds base member 160 against washer 208 with sufficient tensional force to prevent base member 160 from being inadvertently rotated. However, the tightness of nut 212 on bolt 200 and the consequent compressive force applied to washer 208 is also such that base member 160 may be rotated by an operator between the locking and unlocked positions by applying moderate rotational force to base member 160.

Restraining member 170 includes a first end 172 having a foot 174. Foot 174 is disposed such that it extends into the slide path of cage 130 within rack system 140 when base member 160 is in the locking position, thereby preventing cage 130 from being removed from rack system 140.

Restraining member 170 and base member 160 are rotatably coupled and held together by a pivot assembly 180. As best shown in FIG. 18, pivot assembly 180 preferably comprises a bolt 181, a first washer 183, a spring 185, a second washer 187 and a nut 189. Bolt 181 comprises a shaft 184 bounded by a head 182 at one end and a threaded portion 186 at the other end. Bolt 181 passes through first washer 183 and thereafter through a stepped hole 191 in restraining member 170.

A recess 193 in restraining member 170 is disposed concentrically with hole 191 to accept head 182 of bolt 181 to thereby prevent head 182 from extending beyond knee 173 and potentially into the slide path of cage 130, especially when restraining member is disposed in the second position discussed above. A shoulder 194 (FIG. 20) in recess 193 prevents head 182 from further movement toward base member 160. Bolt 181 next passes through a hole 162 in base member 160. Holes 191 and 162 each have a similar diameter, which is preferably only slightly greater than the diameter of shaft 184 of bolt 181. Next, bolt 181 passes beyond a shoulder 164 and into a circular bore 166 which has a greater diameter than that of hole 162. Bolt 181 then passes through the axial center of spring 185 and through a hole 188 in second washer 187. Finally, nut 189 is screwed onto threaded portion 186 of bolt 181. The diameter of bore 166 and the outer diameter of second washer 187 are each at least as great as the diameter of spring 185, and the outer diameter of nut 189 is at least as great as the diameter of hole 188 in second washer 187.

Thus, spring 185 surrounds shaft 184 of bolt 181 and is held between shoulder 164 of base member 160 and second washer 187. In this manner, spring 185 biases bolt head 182 against shoulder 194 and spring 185 is compressed when head 182 of bolt 181 is pulled away from base member 160. When head 182 of bolt 181 is fully inserted into recess 193 so that it contacts shoulder 194, nut 185 should be screwed onto bolt 181 to a position at which second washer 187 holds spring 185 under light to moderate compression against shoulder 164 when a tongue 168 and a groove 196 are mated and in contact with one another.

Figure 19:
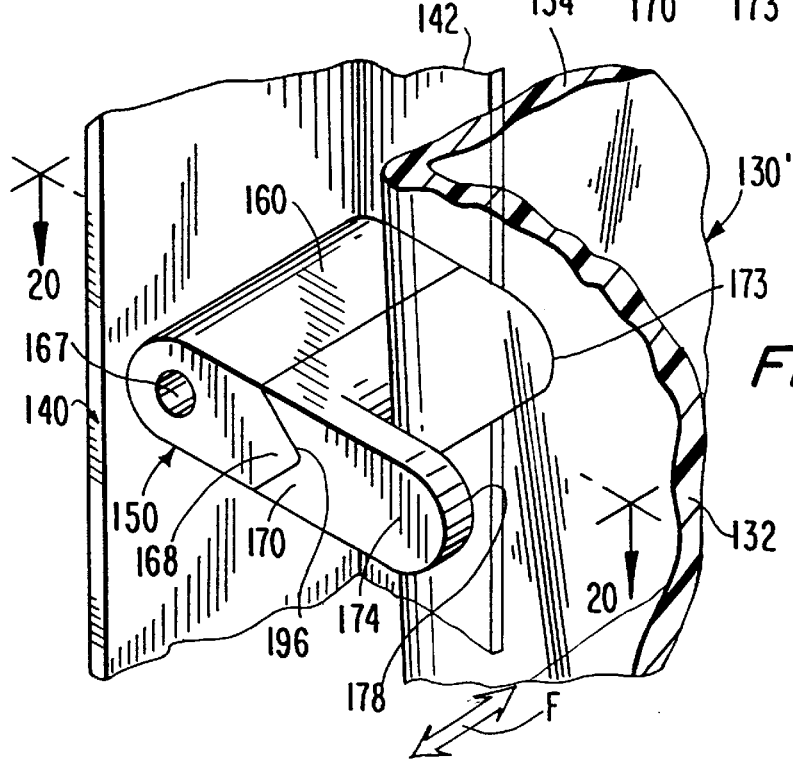
FIG. 19 is a perspective view of a member for locking a cage within a rack constructed in accordance with the present invention in which the member is in a locking position for locking a long cage within the rack.

As shown in FIGS. 18 and 19, in a preferred embodiment, base member 160 is provided with a generally convex tongue 168 in the shape of a wedge which is laterally disposed along the surface of base member 160 abutting restraining member 170. Likewise, restraining member 170 is provided with a generally concave groove 196 which is dimensioned to interlock or mate with tongue 168 in a substantially flush manner. Tongue 168 and groove 196 prevent restraining member 170 from rotating with respect to base member 160 when restraining member 170 is held against base member 160 so that tongue 168 and groove 196 are mated. It is to be understood that tongue 168 and groove 196 may be disposed on the base member 160 and restraining member 170 respectively, and may alternatively disposed on the restraining member 170 and base member 160 respectively. It is also to be understood that tongue 168 and groove 196 may be provided in other mating shapes, including arcuate or serrated arrangements, so long as the particular shape chosen is formed symmetrically about the pivot assembly 180 to allow restraining member 170 to mate with and be securely held against base member 160 in any rotated position chosen for locking a cage 130 of a particular length within rack system 140.

Pivot assembly 180 accordingly acts as a tensioner which biases the restraining member and the base member together, but which permits an operator to pull restraining member 170 a distance away from base member 160 to rotate restraining member 170 for choosing a position for foot 174 which accommodates and properly locks cage 130 within rack system 140. The distance which restraining member 170 may be pulled away from base member 160 should be sufficient to allow restraining member 170 to clear the tongue 168 of base member 160 in order to permit the required rotation of restraining member 170. Thus, spring 185 must be compressible over at least this distance. After restraining member 170 has been rotated to the proper position, the operator may release restraining member 170. Once released, compressed spring 185 of pivot assembly 180 exerts force against second washer 187 and nut 189, which pulls bolt 181 together with head 182 toward base member 160. Since head 182 rests against shoulder 194 of restraining member 170, restraining member 170 itself will be biased toward base member 160, thus permitting tongue 168 and groove 196 to mate and to thereby secure restraining member 170 in the position selected by the operator.

It is important to ensure that cage 130 does not move along its slide path within rack system 140 once cage 130 has been properly positioned within rack system 140, as a cage coupling in cage 130 (not shown) may become partially or wholly disengaged from a mating coupling within rack system 140 through which air and/or water may be provided to animals within cage 130. When such disengagement unintentionally occurs, adverse consequences can result, such as drowning of animals within the cage by a water valve stuck open, or suffocation of animals within the cage by a disruption in air supply. To this end, foot 174 is preferably disposed such that it substantially abuts front end wall 132 of cage 130 when cage 130 is properly positioned within rack system 140 such that the necessary couplings are properly and securely engaged. The substantial abutment of foot 174 against front end wall 132 thereby ensures that cage 130 is substantially immobile within rack system 140 along the slide path, and that animals within cage 130 are therefore secure. Although abutment between foot 174 and cage 130 is preferable, it is to be understood that foot 174 and cage 130 need not be in actual contact with each other. Rather, foot 174 need only prevent cage 130 from being inadvertently moved along the slide path to an extent that any couplings between cage 130 and rack system 140 are apt to become disengaged, or to an extent that cage 130 is likely to fall out of rack system 140.

In order to allow cages 130 of various lengths to be locked within rack system 140 using the same locking mechanism 150, restraining member 170 of locking mechanism 150 is rotatable with respect to base member 160 about pivot assembly 180 to allow foot 174 to be interposed at various positions within the slide path of cage 130. For example, restraining member 170 may be rotatable between at least a first position for locking a first cage 130 of a predetermined length within rack system 140, and a second position for locking a second cage 130' of a different size than the first cage within the rack. Such an arrangement may be required where second cage 130' is longer than first cage 130 (that is, second cage 130' projects further from the rear of rack system 140 and any couplings therein than first cage 130).

Figure 15:
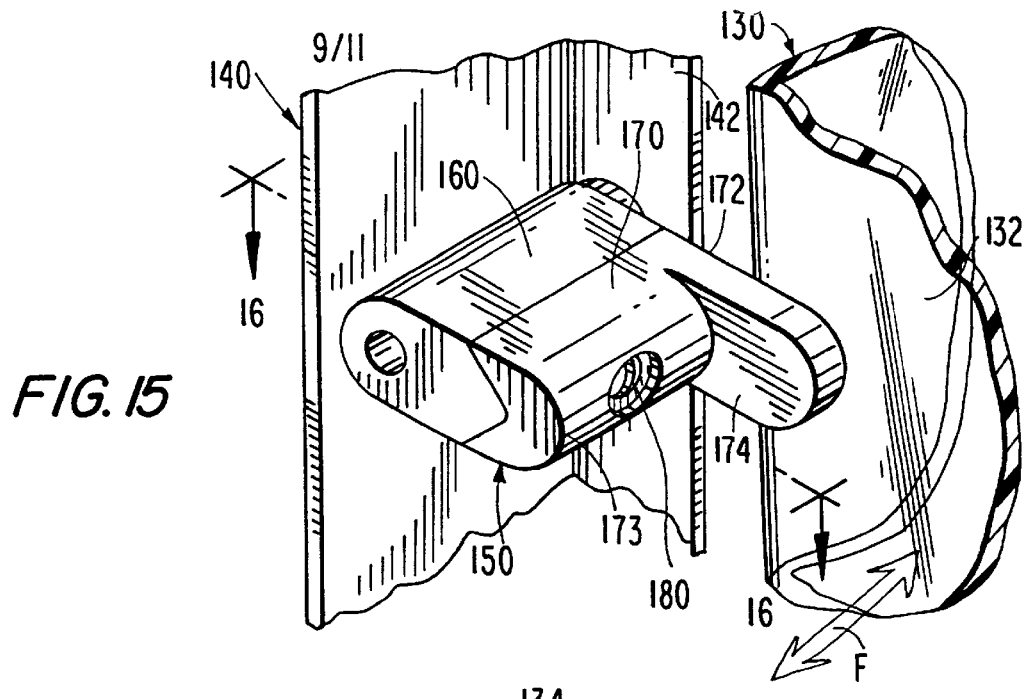
FIG. 15 is a perspective view of a member for locking a cage within a rack constructed in accordance with the present invention in which the member is in a locking position for locking a short cage within the rack.
Figure 17:
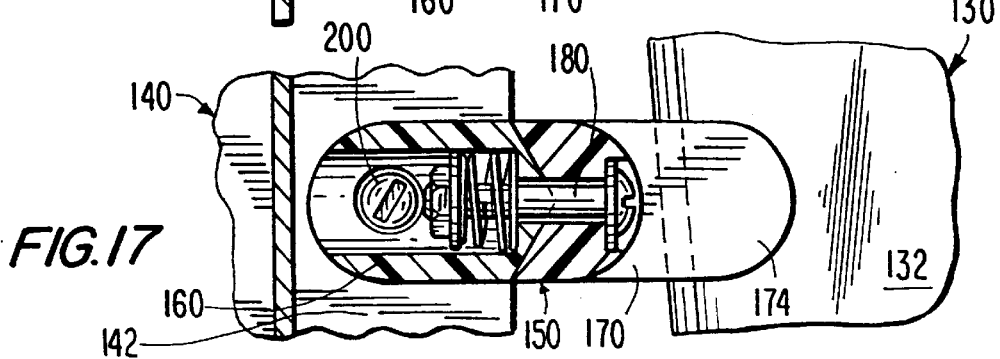
FIG. 17 is a sectional view taken along the line 17—17 of FIG. 16.

Using this example, FIGS. 15–17 most clearly depict restraining member 170 disposed in the first position, and FIG. 20 also shows restraining member 170 disposed in the first position in phantom. In this first position, end 172 and foot 174 of restraining member 170 are positioned so as to be as close as possible to the rear of rack system 140 within the range of positions available about pivot assembly 180. As can be seen, outer face 176 of foot 174 preferably substantially abuts front end wall 132 of cage 130 to lock first cage 130 within rack system 140.

Should it be desired to lock second cage 130', longer than first cage 130, in the same general position within rack system 140, restraining member 170 need only be rotated about pivot assembly 180 to the second position, most clearly depicted in FIGS. 19–20. In the second position, end 172 and foot 174 of restraining member 170 are positioned so as to be as far as possible away from the rear of rack system 140 within the range of positions available about pivot assembly 180. Knee 173 of restraining member 170 is disposed outside of the slide path of cage 130' such that side wall 134' of cage 130' may extend alongside of knee 173 without interference therefrom. However, as can be seen, foot 174 is interposed within the slide path of cage 130' once cage 130' has been properly positioned within rack system 140. Inner face 178 of foot 174 preferably substantially abuts front end wall 132 of cage 130' to lock cage 130' within rack system 140.

While a two-position rotatable restraining member 170 has been described in the embodiment noted above, it is to be understood that a restraining member 170 for locking cages of more than two different lengths is encompassed by the invention. For instance, foot 174 may be rotated about pivot assembly 180 through any plurality of positions, each of which interposes foot 174 at a different position within the slide path of cage 130, and which could thereby lock cages of the same plurality of lengths within rack system 140. Alternatively, restraining member 170 could be provided with more than one foot 174, each of which being disposed on restraining member 170 at a different position within the slide path of cage 130. In still another embodiment, restraining member 170 could be slidably disposed on base member 160, permitting foot 174 to be selectively disposed within the slide path of cage 130 by sliding restraining member 170 respective to base member 160 to a desired position within the slide path for locking the cage.

As noted above, restraining member 170 is rotatable with respect to base member 160 to allow restraining member 170 to be selectively rotated between at least a first position and a second position for locking cages of different sizes within rack system 140. To ensure that restraining member 170 is securely positioned with respect to base member 160 once a particular rotation has been selected, the tongue 168 and groove 196 system discussed above is preferably utilized to mate restraining member 170 and base member 160 and to prevent rotation of the two members with respect to each other.

Figure 21:
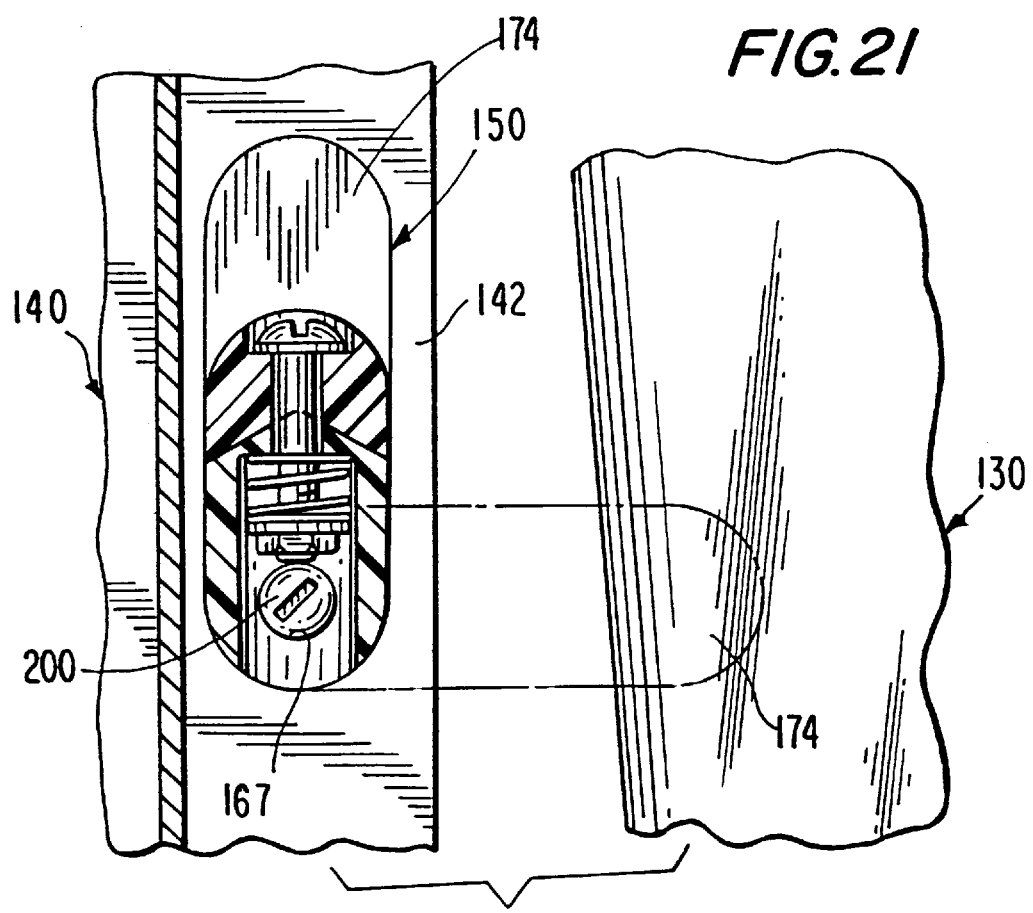
FIG. 21 is a sectional elevational view of a member for locking a cage within a rack constructed in accordance with the present invention.

Utilizing a bolt arrangement for mounting base member 160 to rack system 140 allows base member 160 to be rotatably screwed to post 142 in a manner which moves foot 174 of restraining member 170 from the locking position shown in phantom in FIG. 21 generally upward and toward post 142 to the unlocked position in which foot 174 is removed from the slide path of cage 130. Alternatively, foot 174 may be moved downward from the locking position and toward post 142 to the same effect. When base member 160 is rotated to the unlocked position, cage 130 may be freely moved into or out of rack system 140 along the slide path without interference from locking mechanism 150. Once cage 130 has been fully and properly inserted into the rack, base member 160 may again be rotated to the locking position to lock cage 130 securely within rack system 140.

By providing a locking mechanism with a restraining member rotatable between a plurality of positions for interposing foot at a plurality of positions within the slide path of cage, a single locking mechanism is provided which is capable of locking cages of a plurality of different lengths within a rack system. By further providing a locking mechanism with a base member which is rotatable between a locking and unlocked position, a simple mechanism is provided which easily and quickly allows secure locking and unlocking of a cage within a rack system with a minimum of effort and a minimum number of parts. In addition, by providing a locking mechanism which is mounted to a post of a rack system accessible from the front of the rack system, a readily visible locking mechanism is provided which allows an operator to easily determine whether a cage is properly secured within the rack system.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A filter cap for an open-top cage comprising:

a substantially rigid bonnet adapted to cover the open top of the open top cage, the bonnet having a body portion with a perforated top and side walls extending therefrom forming an open bottom end, a substantially rigid filter retainer sized to fit upon the bonnet and to substantially cover the perforated top of the bonnet, the filter retainer having a top end with perforations substantially coextensive with the perforations in the top of the bonnet, the filter retainer also having side walls extending from the top end thereof forming an open bottom end, the perforations in the filter retainer being substantially in alignment with the perforations in the bonnet when the filter retainer is mounted on the top of the bonnet; and securement means for detachably securing the filter retainer to the bonnet to permit enclosure of a sheet of filter material therebetween, the securement means being integrally formed in the bonnet and the filter retainer.

2. The filter cap of claim 1, wherein the securement means comprises at least one detent formed on at least one side wall of the bonnet, and at least one slot formed in at least one side wall of the filter retainer disposed so as to receive the detent therein when the filter retainer is mounted on the bonnet.

3. The filter cap of claim 1, wherein the securement means comprises at least one detent formed in at least one side wall of the filter retainer, and at least one slot formed in at least one side wall of the bonnet disposed so as to receive the detent therein when the filter retainer is mounted on the bonnet.

4. The filter cap of claim 1, wherein the perforations in the top of the bonnet are sufficiently small to prevent an animal within the cage from causing substantial damage to filter material enclosed between the bonnet and the filter retainer.

5. The filter cap of claim 1, wherein said bonnet and said filter retainer have sufficient flexure to allow the bonnet and the filter retainer to flex relative to each other.

* * * * *